April 5, 1960  M. B. BOSWORTH ET AL  2,931,117
HEAT RESISTANT SHATTER-PROOF SIGN PANEL
Filed Dec. 10, 1953
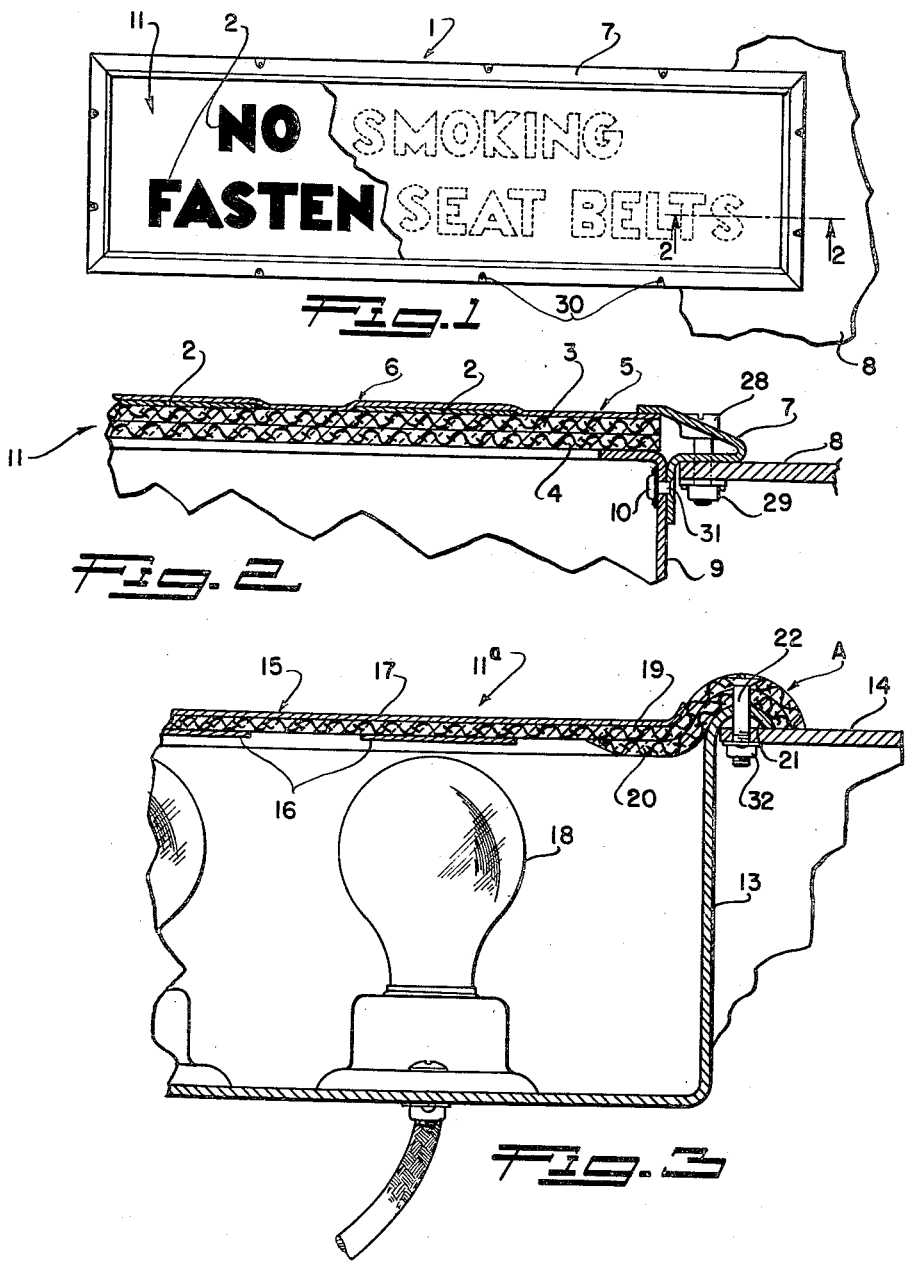
*INVENTORS*
MELVIN B. BOSWORTH
COREY C. BRAYTON
By *George C. Sullivan*
Agent United States Patent Office 2,931,117
Patented Apr. 5, 1960

2,931,117

HEAT RESISTANT SHATTER-PROOF SIGN PANEL

Melvin B. Bosworth, Glendale, and Corey C. Brayton, Los Angeles, Calif., assignors to Lockheed Aircraft Corporation, Burbank, Calif.

Application December 10, 1953, Serial No. 397,357

4 Claims. (Cl. 40—135)

This invention relates to lenses for lighting assemblies, illuminating devices, annunciators, etc., and relates more particularly to practical shatterproof, shock, vibration and temperature resistant panels.

The panels of the present invention have a wide field of application and may be used under various conditions and in various environments. A typical illustrative field of use is aircraft although reference to such usage is not to be taken as limiting the invention.

The present form of glass panels for the lights, signs, and visual indicators of various types, in or on aircraft, have a very high replacement factor. This replacement factor is due primarily to the shattering or breaking of the panels caused by various stresses to which the glass is subjected. Rapid changes in temperature of the glass panels and their associated mounting brackets or frames may often cause the failure of a light installation by shattering or breaking the glass lens. Discoloration of the glass panel by the action of heat and sunlight may also be a reason for replacement. As it is often desirable to have the panels for the lights and signs, etc. either concave, convex, or in other forms, other than flat, the glass panels thus used are more expensive to manufacture and due to the very nature of their configurations more subject to breaking or shattering. Rapid temperature and pressure changes or sudden and unusual maneuvering of the aircraft set up loads in the aircraft that often cause ordinary glass panel to break or shatter. The use of a glass panel with a metal frame can, in installation, set up mechanical stresses and forces which, at very slight or unusual movement of the aircraft, also shatter the glass panel. The glass panel may even be broken while being installed due to the very nature of its construction as the glass panel holding attachment may be incorrectly secured by even skilled and experienced personnel.

Glass panels are comparatively easily broken by blows or objects striking them, and in the normal operation of aircraft such a possibility is continuously present. External lights with panels of glass mounted on the extension of aircraft are unprotected and are subject to fracture by ice or objects in the air striking them. In high performance aircraft a failure of a glass panel due to these causes is more likely than in an aircraft whose design characteristics do not call for an exceedingly high performance. A small object striking a glass panel of an external lamp of a high speed aircraft can, and most often does, cause complete failure of the glass panel and the associated light installation.

Weight in aircraft is of vital importance due to the high speed and great distances traveled. The great distance and high speed requirements may mean a greatly increased fuel load and, consequently, a reduction in pay load. A glass panel and the necessary frame and light carrying container, when assembled and installed, add to the weight of the aircraft and consequently a reduction of pay load or fuel load is necessary. A light-in-weight, strong, easily replaceable panel, together with the elimination of framing and attaching hardware, are features much desired in illuminating fixtures and panels for aircraft.

An object of this invention is to provide a panel for lights, lamps, signs, annunciators, and the like, that is weight saving.

Another object of this invention is to provide a heat resistant panel or covering for lights.

Still another object of this invention is to provide a panel or light covering that does not require a metal frame, or the like, to secure the panel to the light fixture.

A still further object of this invention is to provide a panel or light transmitting covering that is inexpensive to manufacture.

Another object of this invention is to provide a panel or light covering that is easily adapted to various shapes and configurations.

A still further object of this invention is to provide a more rapid and economical means of furnishing light information of a required color.

Further objects of this invention will become evident from the description of typical embodiments of the invention illustrated in the following drawings wherein:

Figure 1 is a plan view of an application of one form of the present invention;

Figure 2 is an enlarged fragmentary sectional view of the device of Figure 1 taken at line 2—2;

Figure 3 is a fragmentary sectional view of another form of the present invention.

Referring now to Figure 1 of the drawings there is shown an annunciator or sign 1 of the type used in aircraft for passenger directive purposes. The instructions or message of the sign 1 may be of whatever content the particular application may require. In this illustration pre-landing instructions to aircraft passengers are shown.

In Figure 2 there is shown a portion of Figure 1 illustrating one method of attachment which includes a panel holding bracket 7 having spaced openings receiving attaching bolts 28. Lock nuts 29 may be used to hold the bolts 28 in place. The panel holding bracket 7 is secured to a box or container 9 in which the light source (not shown) for the sign is located. The panel holding bracket 7 is secured to the box 9 by spaced bolts 31 and lock nuts 10 fastened to the box 9.

The panel 11 of Figures 1 and 2 in this particular application comprises one or more thicknesses, sheets, or layers, 3 and 4, of desirable or selected fibers, cloth, fabric, netting, felt, or the like, which are impregnated with a suitable resin. In Figure 5 the woven materials 37 and 38 of the panel 39 is shown impregnated with a resin 36.

In the drawings, fiberglass fabric, or the like, is shown but it is not intended to limit the present invention to fiberglass fabric as other materials may be used. The nature of the layers 3 and 4 is more fully described below. At 6 there is shown, exaggerated as to scale, lettering 2 which is applied to the outside surface of the plastic or resin panel 11. There is also shown at 5, Figure 2, a protective paint coating which may be a rigid polyester laminating resin and which will subsequently be more fully described.

Referring now to Figure 3 there is shown a different method of securing a panel 11ª to the structure 14 of the aircraft. The panel 11ª in this instance has an integral marginal portion or molding A which is formed when the panel is manufactured. The marginal portion or molding A of the panel 11ª is molded into a curved or semi-circular raised configuration. Although the molding A, Figure 3 of the drawings, shows a curved or semi-circular raised configuration, other shapes or forms may be developed as a mounting margin and such is contemplated. The box 13, which contains the illuminating element 18 also has a similar curved semi-circular molding A of the panel 11ᵃ. It will be observed that two layers of fibers or fibrous materials 19 and 20 are shown, one, 19, being encased in the panel 11ᵃ proper, and the other layer 20 being added to the marginal portion to give the supporting and mounting molding A additional strength. The panel 11ᵃ and box 13 are secured to the aircraft structure 14 by attaching bolts 22 and lock nuts 32.

In Figure 3, the sign information or lettering 16 is shown applied to the surface of the panel 11ᵃ that faces the light source 18 with a paint coating 17 applied to the surface of the panel 11ᵃ that faces away from the light source 18.

In Figure 3, a particular type of character of light source 18 and 24 is shown, however other means of illumination may be used in connection with the present invention and it is not intended to limit the invention to the particular type of lights shown in the drawings.

The heat resistant panels 11, 11ᵃ and 23 are each made from one or more layers of fiber 3, 4 and 19. The number of layers depends upon the strength that is required in any one panel application. The layers of fibrous material 3, 4 and 19 may be positioned so as the warp of one layer will not coincide with the warp of the adjacent layer, thus giving to the panels 11, 11ᵃ and 23 additional strength. Various fabrics may be used in the panel manufacture such as nylon and rayon and the like. Synthetic fiber threads or metallic threads may be used in the heat resistant panels 11, 11ᵃ and 23, manufacture.

In order to give to the panels 11, 11ᵃ and 23 the properties or characteristics that are required in various applications in an aircraft, suitable fibrous materials are selected and the correct resins are chosen to impregnate the said fibers.

The panel surfaces 11, 11ᵃ and 23 may be treated in various ways. The surfaces may be smooth or glossy, or it may be texturized or pebbled. The shape or form of the panels 11, 11ᵃ and 23 may vary, depending upon the particular application requirements. The panels 11, 11ᵃ and 23 may be concave or convex and, of course, flat. The panels 11, 11ᵃ and 23 may be cast or molded into the required form however, in instances where the impregnating resin 36 will give to the panels 11, 11ᵃ and 23 resilience and flexibility, the panels 11, 11ᵃ and 23 may be bent to the required configuration.

A silicone molding compound or resin is one class of plastics that may be very well used as an impregnating resin in the panels 11, 11ᵃ and 23 manufacturing process. Some of the properties of the silicone resins that are most desirable are, first a high tensile strength of from 2800 to 3200 pounds per square inch, second, the ability to withstand a continuous temperature of 480° F. and, third, has very good dielectric properties. Other desirable characteristics of the silicone resins are a low water absorption rate, a negative burning rate, show little effect of sunlight, and are not affected by metal. The machining properties of silicone resins are very good and also they, the silicone resins, are translucent. Wide choice of color possibilities is also characteristic of the silicone resins.

Another class of resins that may be ued to impregnate the body material of the panels 11, 11ᵃ and 23, are the methacrylate resins. The tensile strength of methacrylate resins runs from 6000 pounds to 10,000 pounds per square inch, and the heat resistant factor runs from 140° to 200° F. continuous. Methacrylate resins have a very slow burning rate and are only slightly affected by sunlight. The clarity of the methacrylate resins is acceptable as the light transmission percentage of the methacrylate resins is from 90 to 92 percent. The color possibilities of this class of resins are unlimited.

There are many other resins that may be used in the panel fabrication process such as styrenes, polyesters, vinyls, or the like, and the choice of a suitable resin depends upon the use of the panel and the properties the panel must possess in order to meet particular design requirements.

In the utilization of heat resistant panels 11, 11ᵃ and 23 in aircraft signs 1, lettering or indicia 2 may be applied to either the side nearest the light source at 16, Figure 3, or to the exposed side of the sign as at 6 in Figure 2. A silk screen process may be used to apply the indicia 2 or the indicia 2 may be applied by stenciling, masking, freehand, or by the vacuum metalizing process. When the aircraft is destined for foreign use the signs 1, or directives applied to the panels 11, 11ᵃ and 23, may be in whatever language is appropriate.

The indicia 2 may be designed to contrast with the coloring of the panels 11, 11ᵃ and 23, or to match any color scheme used. The lettering or indicia 2 on the heat resistant panels 11, 11ᵃ and 23 may be fluorescent or of a radio-active or isotopic nature which, in certain applications, may be desired. It is possible to adapt the panels 11, 11ᵃ and 23 herein described to many uses and applications.

The panel 11, Figure 2, is shown attached to the aircraft structure 8 by a frame or bracket 7. The panel 11ᵃ in Figure 3 is mounted by a mounting edge or margin A molded into the panel 11ᵃ. This feature of the panel 11ᵃ facilitates the mounting of the panel 11ᵃ and is also a weight saving factor as it eliminates the need for a frame or mounting bracket.

Figure 2 shows the indicia 6 applied to the surface of the panel 11 furtherest away from the light source (not shown). The exposed or front surface of panel 11 may be then covered with a translucent paint or plastic 5 to make the indicia 6 relatively invisible in normal light. Then when the light source is actuated the indicia 6 on the panel 11 will become visible. It has been found desirable to employ a composition such as Garalease #915 or Plaskon #941.

Having thus described our invention, it will be understood that the details set forth need not be strictly adhered to but that various changes and modifications may suggest themselves to one skilled in the art, all falling within the scope of the invention as defined by the following claims.

We claim:

1. A shatterproof panel including a body of light transmitting plastic and at least one layer of fiber glass fabric embedded in and reinforcing the body, the body presenting an external surface; substantially opaque indicia on said surface and a film on said surface covering said indicia for passing light transmitted outwardly through the body and for substantially concealing said indicia in the absence of such light.

2. A shatterproof lens including a body of light transmitting plastic and at least one layer of fiber glass fabric in and reinforcing the body, a concave, convex, marginal molding as an integral part of said body, the body presenting an external surface and an internal surface, substantially opaque indicia on one of said surfaces and a film on said external surface for passing light transmitted outwardly through the body and for substantially concealing said indicia in the absence of such light.

3. A shatter-proof panel including a body of light transmitting plastic, at least one layer of fiber glass fabric embedded in and reinforcing the body, the body presenting an external surface and an internal surface, substantially opaque indicia on one of said surfaces, a unidirectional light transmitting film on said external surface for passing light transmitted outwardly through the body and for substantially concealing said indicia in the absence of such light, and said film adaptable to conceal said indicia in the presence of light directed inwardly through said body.

4. A shatterproof panel including a body of light transmitting plastic and at least one layer of fiber glass fabric embedded in and reinforcing the body, the body presenting an external surface and internal surface, substantially opaque indicia on one of said surfaces and a film on said external surface for passing light transmitted outwardly through the body and for substantially concealing said indicia in the absence of such light.

References Cited in the file of this patent

UNITED STATES PATENTS

| Number | Name | Date |
|---|---|---|
| 720,877 | Bloch | Feb. 17, 1903 |
| 1,206,287 | Auerbacher | Nov. 28, 1916 |
| 1,393,500 | Clark | Oct. 11, 1921 |
| 1,402,075 | Kolk | Jan. 3, 1922 |
| 1,408,109 | Macbeth | Feb. 28, 1922 |
| 1,442,005 | Sapp | Jan. 9, 1923 |
| 1,497,989 | Russell | June 17, 1924 |
| 1,509,049 | Marston | Sept. 16, 1924 |
| 1,579,597 | Craig | Apr. 6, 1926 |
| 1,633,315 | Dale | June 21, 1927 |
| 1,805,327 | Carr | May 12, 1931 |
| 2,089,351 | English | Aug. 10, 1937 |
| 2,117,321 | Hill | May 17, 1938 |
| 2,282,876 | Newman | May 12, 1942 |
| 2,306,387 | Huntley | Dec. 29, 1942 |
| 2,365,034 | Wirtz | Dec. 12, 1944 |